(12) United States Patent
Nishibe et al.

(10) Patent No.: US 6,385,733 B1
(45) Date of Patent: May 7, 2002

(54) COMPUTER MONITOR DEVICE

(75) Inventors: Yasushi Nishibe; Yoshiharu Kawarazaki, both of Aichi-ken (JP)

(73) Assignee: Kabushiki Kaisha Tokai-Rika Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/308,653

(22) PCT Filed: Dec. 1, 1997

(86) PCT No.: PCT/JP97/04383

§ 371 Date: Jun. 1, 1999

§ 102(e) Date: Jun. 1, 1999

(87) PCT Pub. No.: WO98/25207

PCT Pub. Date: Jun. 11, 1998

(30) Foreign Application Priority Data

Dec. 2, 1996 (JP) ............................................. 8-322018

(51) Int. Cl.$^7$ ................................................. G06F 1/32
(52) U.S. Cl. ........................................ 713/322; 713/601
(58) Field of Search ............................. 713/2, 300, 320, 713/322, 323, 600, 601; 714/23, 34, 55

(56) References Cited

U.S. PATENT DOCUMENTS

| | | | |
|---|---|---|---|
| 4,566,111 A | * | 1/1986 | Tanagawa .................... 377/28 |
| 4,752,930 A | | 6/1988 | Kitamura et al. |
| 4,809,280 A | * | 2/1989 | Shonaka ...................... 714/55 |
| 4,906,979 A | * | 3/1990 | Kimura ...................... 340/658 |
| 5,157,699 A | * | 10/1992 | Miyazaki et al. ............. 377/28 |
| 5,175,845 A | | 12/1992 | Little |
| 5,502,812 A | * | 3/1996 | Leyre et al. .................. 714/10 |
| 5,784,627 A | * | 7/1998 | MacDonald ................ 713/300 |

FOREIGN PATENT DOCUMENTS

| | | |
|---|---|---|
| JP | 5-61726 | 3/1993 |
| JP | 5-189272 | 7/1993 |

* cited by examiner

*Primary Examiner*—Thomas M. Heckler
(74) *Attorney, Agent, or Firm*—Nixon Peabody LLP; Thomas W. Cole

(57) ABSTRACT

A computer monitoring device is provided that prevents a microcomputer from entering an operational state that cannot be monitored. The microcomputer is started at an output signal Q of a determination circuit 36 is reset by a reset signal RS output from a watchdog circuit 34. Thereafter, when a clock signal ck is input from the started microcomputer, the determination circuit outputs a clock signal CK to the watchdog circuit and sets the output signal. However, when the standby signal st is detected at the time of starting the microcomputer, the output of the clock signal CK and the set of the output signal Q are stopped. In this way, the standby signal ST is not output from the AND circuit 38 to the watchdog circuit, the output of the reset signal from the watchdog circuit is repeated, and the microcomputer does not operate.

1 Claim, 6 Drawing Sheets

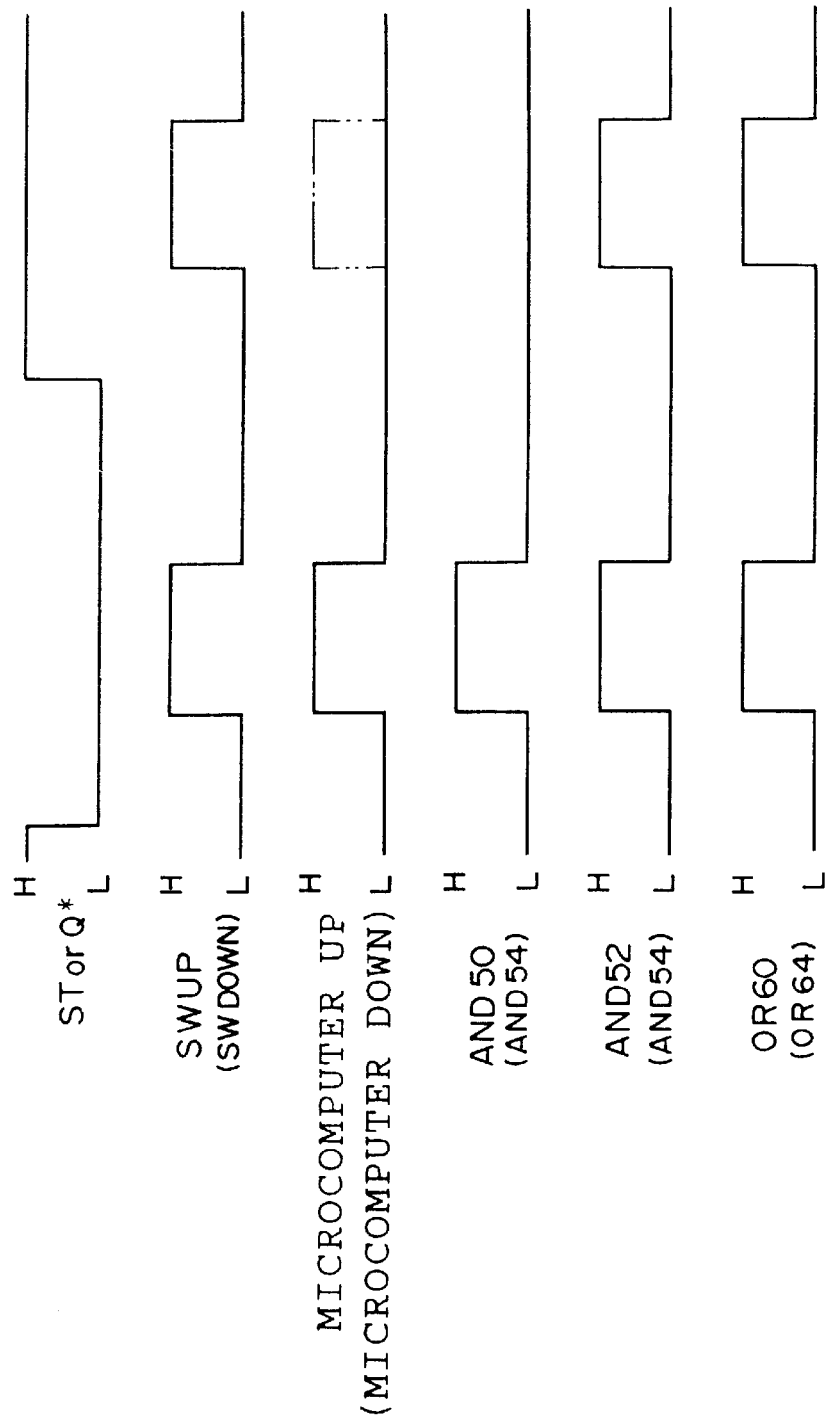

COMPUTER MONITOR DEVICE

TECHNICAL FIELD

The present invention relates to a computer monitoring device which monitors whether a computer provided at a power window system of a vehicle or the like operates normally.

TECHNICAL BACKGROUND

Conventionally, in a system using a microcomputer in which a battery is a power supply, when the microcomputer is not used, the microcomputer enters a standby mode and the execution of a program is stopped in order to reduce electricity consumption of the battery. Further, a microcomputer monitoring circuit (watchdog circuit) is provided in the system using the microcomputer. The microcomputer monitoring circuit monitors a state of the microcomputer by the output of a predetermined signal (e.g., a signal which is generated on the basis of a clock signal and will be hereinafter referred to as "clock signal") from the microcomputer. When the clock signal is not detected, the microcomputer monitoring circuit determines that the state of the microcomputer is not normal and outputs a signal which restarts the microcomputer (hereinafter, "restarting signal").

On the other hand, because the microcomputer stops the output of the above-described clock signal by entering the standby mode, the microcomputer monitoring circuit outputs the restarting signal. As a result, the microcomputer which is supposed to enter the standby mode is restarted.

In order to prevent the restarting of the microcomputer which is supposed to enter the standby mode, when the microcomputer monitoring circuit detects a signal which is output when the microcomputer enters the standby mode (hereinafter, "standby signal"), the microcomputer monitoring circuit also enters the standby mode. Namely, when the standby signal is detected, the microcomputer monitoring circuit enters the standby mode and stops the monitoring function of the microcomputer.

An example of a system which includes the microcomputer and the microcomputer monitoring circuit is a power window system of a vehicle. In this power window system, a microcomputer controls a relay or the like and operates a motor for raising and lowering a door glass in accordance with a switch operation. At this time, a microcomputer monitoring circuit monitors an operating state of the microcomputer in order to prevent the control of the motor from being disabled due to runaway or the like of the microcomputer. When it is determined that the microcomputer does not operate normally, a restarting signal is output to the microcomputer.

On the other hand, the power window system includes a microcomputer control system and an SW control system (direct control by a switch) so as to control the motor in accordance with the switch operation. The motor is usually controlled by the microcomputer control system. When the microcomputer enters the standby mode or it is determined by the operating state of the microcomputer monitoring circuit that the operation of the microcomputer fails, the motor is controlled by the SW control system. In this way, the motor can be controlled even if the microcomputer does not operate normally.

By the way, when a microcomputer port or an input terminal of the microcomputer monitoring circuit fails, the standby signal may be input to the microcomputer monitoring circuit by mistake. In this case, even when the microcomputer becomes abnormal and the restarting signal is output, since the microcomputer monitoring circuit detects the standby signal, the microcomputer monitoring circuit enters the standby mode and stops monitoring of the microcomputer which is a fundamental function.

In order to prevent this, a microcomputer monitoring circuit has been proposed which, when a restarting signal is output, does not enter a standby mode even if a standby signal is detected, and which can monitor the microcomputer even if the microcomputer is started in a state in which a wrong standby signal is detected. When this microcomputer monitoring circuit detects a reset signal which is output from a watchdog circuit at the time of starting the microcomputer and thereafter detects a standby signal before detecting a clock signal, the microcomputer monitoring circuit ignores the standby signal and monitors the microcomputer on the basis of the clock signal.

However, if the microcomputer operates properly even if a state of the microcomputer cannot be monitored properly, the above-described microcomputer monitoring circuit continuously monitors the microcomputer. As a result, when, for example, the microcomputer enters the standby mode and the clock signal is stopped, a drawback arises in that the microcomputer is restarted.

The present invention was developed in light of the above circumstances, and the object thereof is to provide a computer monitoring device which monitors a microcomputer only when a state of the microcomputer can be monitored properly.

DISCLOSURE OF THE INVENTION

In order to solve the above-described problems, the present invention comprising: starting means which outputs a starting signal before starting a computer, the starting means outputting a starting signal to the computer when a first signal, which is output from the started computer in a predetermined cycle, is stopped for a predetermined period of time; start stopping means which stops an operation of the starting means when a second signal, which is output from the computer with a predetermined timing, is input; signal output means which outputs a first signal, which is output from the microcomputer in a state in which the second signal is not detected, to the starting means; start operation determination means which outputs a third signal, which urges stopping of the operation of the start stopping means, due to inputting of the starting signal, the start operation determination means stopping outputting of the third signal when the first signal is output from the signal output means; and operation monitoring means which stops outputting of the input second signal to the start stopping means when the start operation determination means outputs the third signal.

In accordance with the present invention, the starting means outputs the starting signal after a predetermined time has passed since the first signal, which is output from the computer in a predetermined cycle, is not input. Further, when the second signal, which is output from the computer at the time of entering the standby mode, is detected, the start stopping means stops the operation of the starting means.

On the other hand, the first signal is input to the starting means via the signal output means. When the signal output means detects the second signal, the first signal is not output to the starting means even if the first signal is input.

Further, the start operation determination means outputs the third signal due to the input of the starting signal and stops the output of this third signal by the first signal output from the signal output means. The operation monitoring means outputs this second signal to the start stopping means due to the detection of the second signal and stops the output of the second signal to the start stopping means when the third signal is detected.

As a result, when the second signal is input by mistake at the time in which the computer is started by the starting signal output from the starting means, the third signal is output from the start determination means and the output of the second signal to the starting means is stopped. Further, since the signal output means does not output the first signal to the starting means, the starting means outputs the starting signal at predetermined time intervals. Consequently, the computer is started by the starting signal input in succession.

In this way, because the computer is started every time the starting signal is output at predetermined time intervals when the second signal is input by mistake, the computer cannot be operated. Accordingly, the computer is not started in a state in which the computer cannot be monitored properly. In other words, the computer cannot be started in a state in which the computer cannot be monitored properly.

In the present invention, when the start operation determination means outputs the third signal, it can be determined if the computer operates properly or if the operation of the computer can be managed properly. The state in which the microcomputer operates can be monitored (determined) from the output of the start operation determination means and the operation monitoring means.

Therefore, when the present invention is applied, for example, to monitor the computer of the power window system, only when the second signal or the third signal is not detected, it can be determined that the computer operates normally. Thus, switching between the microcomputer control system and the SW control system may be effected on the basis of this result of determination.

BRIEF DESCRIPTION OF THE DRAWINGS

FIG. 5 is a timing chart which shows an operation of the relay control circuit.

EMBODIMENTS

Figure 1:
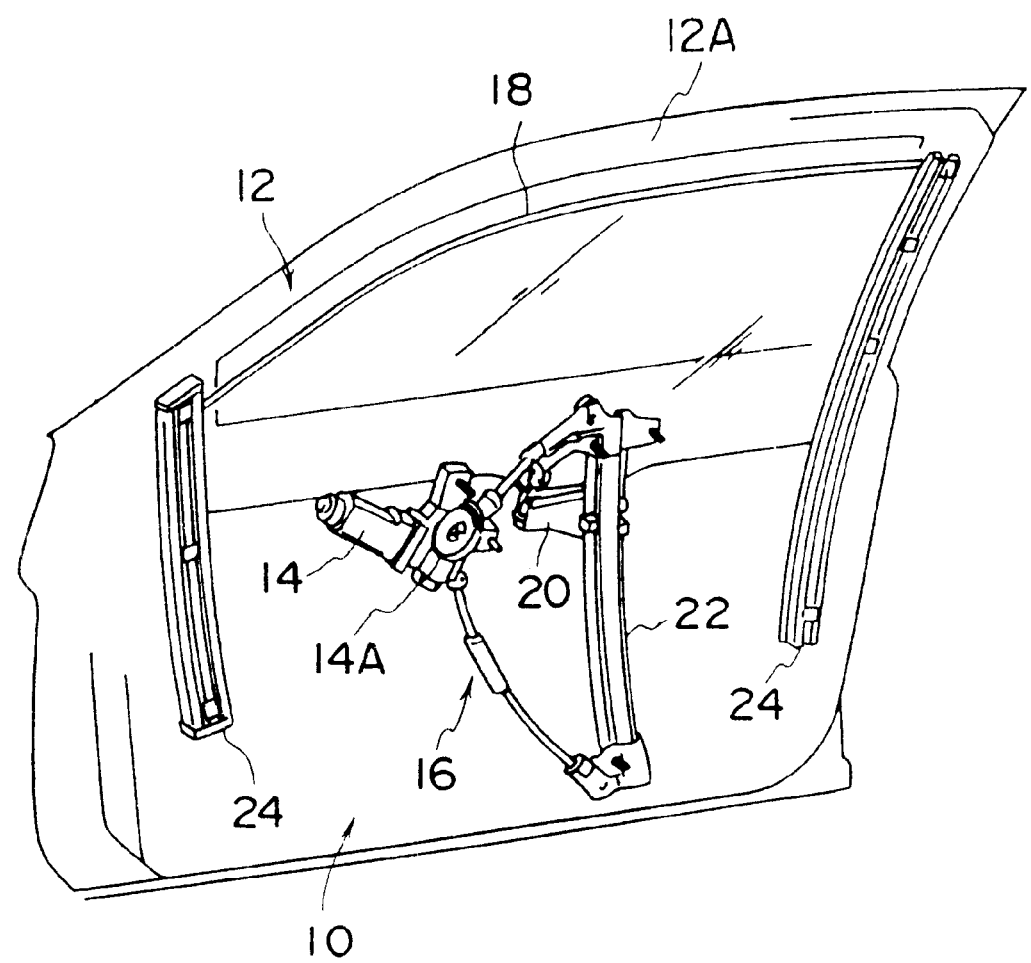
FIG. 1 is a schematic perspective view which shows the internal structure of a vehicle operator's seat side door of a present embodiment.

FIG. 1 shows the internal structure of a vehicle operator's seat side door 12. The inner portion of the vehicle operator's seat side door 12 includes a motor 14 used in a power window system 10 which is applied to a present embodiment. A window regulator portion 16 is connected to this motor 14. In the present embodiment, the window regulator portion 16 is a so-called wire type and an intermediate portion of a wire (not show) is wound around a rotational plate 14A which is attached to a drive shaft of the motor 14. Each of the end portions of this wire is connected to a holding channel 20 which supports the lower end portion of a door glass 18, and further, the holding channel 20 is attached to a main guide 22 so as to be able to move in the vertical directions.

In this way, when the motor 14 rotates in the forward and reverse directions, the holding channel 20 moves along the main guide 22 and the door glass 18 moves in the vertical directions (rises and lowers) along glass guides 24. The window regulator portion 16 is not limited to the wire type and may be an X-arm type, a so-called motor-driven type in which a motor itself moves along a rack, or the like.

When the door glass 18 is raised by the driving of the motor 14, the peripheral end portion of the door glass 18 fits with a weather strip (not shown) which is formed of a rubber and is provided within a frame 12A of the door 12, and an opening of the door frame 12A is closed. Further, when the door glass 18 is lowered by the driving of the motor 14, the opening of the frame 12A which has been closed is opened.

Figure 2:
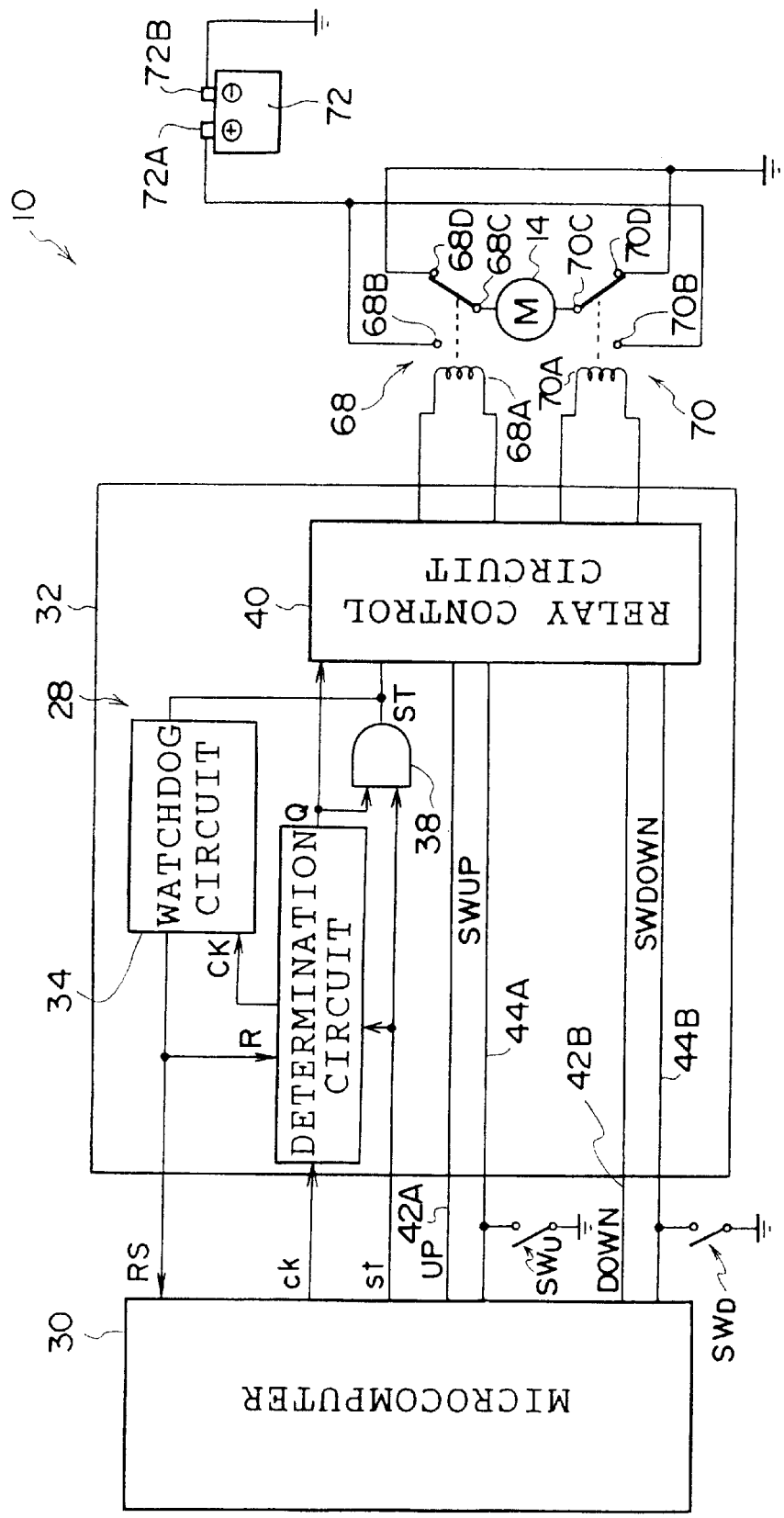
FIG. 2 is a block diagram of a power window system relating to the present embodiment.

FIG. 2 shows a control system which drives the motor 14 of the power window system 10. This control system comprises a microcomputer 30 and a control circuit 32. The microcomputer 30 is formed so that an unillustrated CPU, ROM, RAM, and various types of interfaces are connected by buses. The control circuit 32 includes a watchdog circuit 34, a determination circuit 36, an AND circuit 38, and a relay control circuit 40. A microcomputer monitoring device 28, to which the present invention is applied, is formed by the watchdog circuit 34, the determination circuit 36, and the AND circuit 38.

An UP switch $SW_u$ for raising the door glass 18 and a DOWN switch $SW_D$ for lowering the door glass 18 are connected to the microcomputer 30 and the relay control circuit 40.

When the microcomputer 30 detects that the UP switch $SW_u$ is turned on, an UP signal is output to the relay control circuit 40 via an exclusive line 42A. Further, when the microcomputer 30 detects that the DOWN switch $SW_D$ is turned on, a DOWN signal is output to the relay control circuit 40 via an exclusive line 42B. When the UP switch $SW_u$ is turned on, an SWUP signal is input to the relay control circuit 40 via a switch wiring 44A. When the DOWN switch $SW_D$ is turned on, an SWDOWN signal is input to the relay control circuit 40 via a switch wiring 44B.

In an ordinary operating state, the microcomputer 30 outputs a signal having predetermined cycles such as a signal, which has been generated by synchronizing with, for example, a clock signal or the like, to the control circuit 32 as a first signal (hereinafter, "clock signal ck"). This clock signal ck is input to the determination circuit 36 of the control circuit 32.

On the other hand, the microcomputer 30 outputs a standby signal st to the control circuit 32 as a second signal. This standby signal st is input to the determination circuit 36 and the AND circuit 38, and further, a signal which is in accordance with the standby signal st (standby signal ST) is input from the AND circuit 38 to the watchdog circuit 34. When the microcomputer 30 enters the standby mode for saving electricity or the like, the microcomputer 30 outputs this standby signal st.

When the clock signal ck is input in a state in which the standby signal st is not detected, the determination circuit 36 outputs a signal in accordance with this clock signal ck (hereinafter, "clock signal CK"). This clock signal CK0 is output from the determination circuit 36 to the watchdog circuit 34.

The watchdog circuit 34 comprises start stopping means and starting means. The watch dog circuit 34 includes, for example, a timer circuit which is reset/started by the input of the clock signal CK and outputs a starting signal (reset signal RS) when a measuring time of this timer circuit reaches a predetermined time and the time is up. This reset signal RS is input from the control circuit 32 to the microcomputer 30, and the microcomputer 30 is started or restarted by the input of the reset signal RS. When the standby signal ST in accordance with the standby signal st is input from the AND circuit 38, the watchdog circuit 34 enters the standby mode.

Namely, when the clock signal CK is input to the watchdog circuit 34 at predetermined cycles, the watchdog circuit 34 does not output the reset signal RS. When the clock signal CK is not input, the watchdog circuit 34 outputs the reset signal RS and restarts the microcomputer 30. The reset signal RS can be switched from an H-level to an L-level.

When the watchdog circuit 34 enters the standby mode, the operation of the timer is stopped. In this way, even if the microcomputer 30 enters the standby mode and the output of the clock signal CK is stopped, the watchdog circuit 34 does not output the reset signal RS. Namely, when the standby signal ST in accordance with the standby signal st which is output from the microcomputer 30 is input, the watchdog circuit 34 enters the standby mode and stops monitoring of the microcomputer 30. When the standby signal ST in accordance with the standby signal st is stopped, the watchdog circuit 34 which has entered the standby mode resumes monitoring of the microcomputer 30.

Figure 3A:
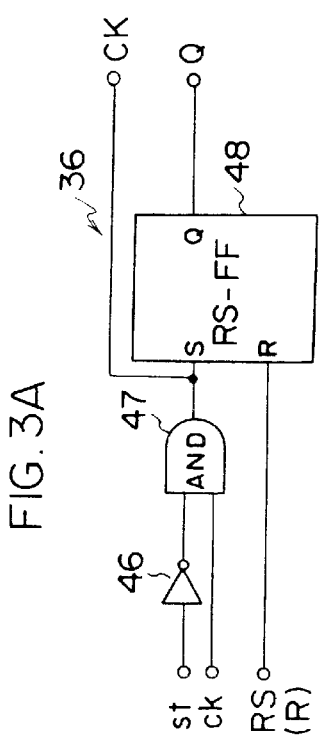
FIG. 3(A) is a logical circuit diagram which shows an example of a determination circuit and FIGS. 3(B) through 3(D) are timing charts on the basis of the logical circuit diagram shown in FIG. 3(A).

As shown in FIG. 3(A), the determination circuit 36 comprises an inverter circuit 46 and an AND circuit 47 which are provided as signal output means and an RS flip-flop circuit (RS-FF, hereinafter "FF circuit 48") which is provided as start operation determination means. The standby signal st is input to the AND circuit 47 via the inverter circuit 46 and the clock signal ck is input to the AND circuit 47. In this way, the AND circuit 47 outputs a clock signal CK in accordance with the clock signal ck and the standby signal st which is input via the inverter circuit 46. This clock signal CK is output to the above-described watchdog circuit 34 and is output to the FF circuit 48 as a set signal S.

Further, the reset signal RS output from the watchdog circuit 34 is input to the FF circuit 48 as a reset signal R. The FF circuit 48 resets an output signal Q due to the input of the reset signal R. In the present embodiment, the reset output signal Q is a third signal.

Figure 3D:
Figure 3C:
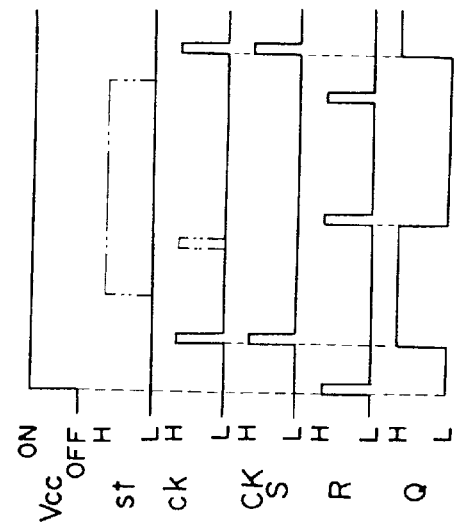
Figure 3B:
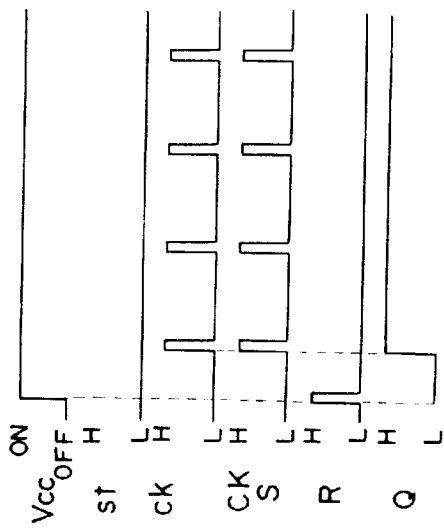

Namely, as shown in FIG. 3(B), in the determination circuit 36, when the clock signal ck is input in a state in which the standby signal st is not input, the set signal is input to the FF circuit 48. In this way, the output signal Q of the FF circuit 48 is set and held at an H-level. Further, in the determination circuit 36, when the reset signal R is input, the output signal Q is reset and held and is output as a third signal. Moreover, as shown in FIG. 3(C), in the FF circuit 48, when the set signal S is input again, the output signal Q is set and the output of the third signal is stopped.

On the other hand, as shown by a double-dashed chain line in FIG. 3(C), in the determination circuit 36, even if the clock signal ck is input, the clock signal CK and the set signal S are not output by the input of the standby signal st. At this time, if the reset signal R is input, the output signal Q is reset. When, for example, an unillustrated ignition switch of the vehicle is turned on and a power supply voltage Vcc is applied, the watchdog circuit 34 outputs the reset signal RS and starts the microcomputer 30.

Consequently, as shown in FIG. 3(D), when supply of the power supply voltage Vcc is started, the determination circuit 36 is reset by the reset signal R output from the watchdog circuit 34. However, when the standby signal st is detected at this time, the determination circuit 36 does not output the clock signal CK even if the clock signal ck is input, and the output signal Q of the determination circuit 36 is held in a reset state.

On the other hand, as shown in FIG. 2, the above-described AND circuit 38 is provided as operation monitoring means of the present invention, and the standby signal st and the output signal Q of the determination circuit 36 are input thereto. When the standby signal st is input, this AND circuit 38 outputs the standby signal ST in accordance with the output signal Q. Namely, when the output signal Q is reset, the AND circuit 38 outputs the standby signal ST in accordance with the standby signal st.

Figure 4:
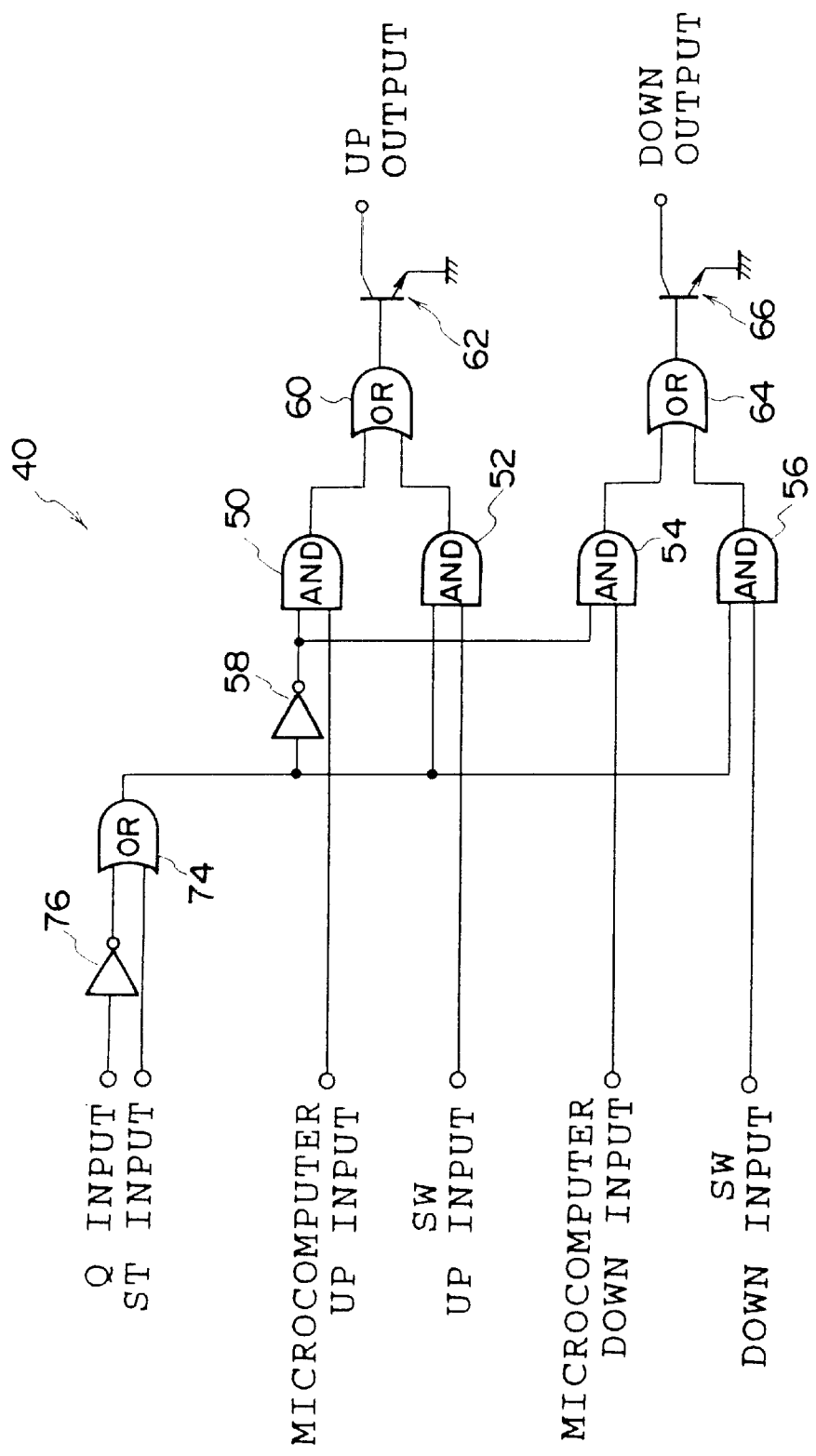
FIG. 4 is a block diagram which shows an example of a relay control circuit.

FIG. 4 shows an example of the relay control circuit 40. This relay control circuit 40 is provided with four AND circuits 50, 52, 54, and 56. The UP signal output from the microcomputer 40 is input to one input terminal of the AND circuit 50, the SWUP signal of the UP switch $SW_u$ is input to one input terminal of the AND circuit 52, the DOWN signal output from the microcomputer 40 is input to one input terminal of the AND circuit 54, and the SWDOWN signal of the DOWN switch $SW_D$ is input to one input terminal of the AND circuit 56.

Further, as shown in FIG. 2, the standby signal ST which is output from the AND circuit 38 and the output signal Q which is output from the determination circuit 36 are input to the relay control circuit 40.

As shown in FIG. 4, the standby signal ST and the output signal Q are input to an OR circuit 74. The output signal Q is input to the OR circuit 74 via an inverter circuit 76 as an inverted signal Q*.

A signal which is output from the OR circuit 74 is input to the other input terminals of the AND circuits 52 and 56, and further, the output signal of the OR circuit 74 is inverted by an inverter circuit 56 and input to the AND circuits 50 and 54.

Output terminals of the AND circuits 50 and 52 are connected to input terminals of an OR circuit 60, and an output terminal of this OR circuit 60 is connected to the base of a transistor 62. Moreover, output terminals of the AND circuits 54 and 56 are connected to input terminals of an OR circuit 64, and an output terminal of this OR circuit 64 is connected to the base of a transistor 66.

In this way, as shown in FIG. 5, when the standby signal ST or the signal Q* inverted from the output signal Q is held at an L-level, the signals, which are output from the OR circuits 60 and 64 by the output of the AND circuits 50 and 54, drive the transistors 62 and 66. Further, when the standby signal ST or the signal Q* inverted from the output signal Q is held at an H-level, the signals, which are output from the OR circuits 60 and 64 by the output of the AND circuits 52 and 54, drive the transistors 62 and 66. By driving the transistors 62 and 66, the transistor 62 outputs a motor UP signal and the transistor 66 outputs a motor DOWN signal.

As shown in FIG. 2, the motor UP signal output from the transistor 62 is input to a relay coil 68A of a relay 68 and the motor DOWN signal output from the transistor 66 is input to a relay coil 70A of a relay 70.

The motor 14 is connected between a common terminal 68C of the relay 68 and a common terminal 70C of the relay 70. Further, contacts 68B and 70B are respectively connected to the common terminals 68C and 70C in a state in which the relays 68 and 70 operate and are connected to a plus side terminal 72A of a battery 72 which supplies electricity for driving the motor 14. Another contacts 68D and 70D are grounded in the same way as a minus side terminal 72B of the battery 72.

In this way, as the relay coil 68A of the relay 68 is energized by the motor UP signal output from the relay control circuit 40, the common terminal 68C is connected to the contact 68B and the motor 14 is driven in the direction of raising the window glass 18. Further, as the relay coil 70A of the relay 70 is energized by the motor DOWN signal output from the relay control circuit 40, the common terminal 70C is connected to the contact 70B and the motor 14 is driven in the direction of lowering the window glass 18.

Next, the operation of the present embodiment will be explained.

When the unillustrated ignition switch of the vehicle is turned on and the power supply electricity Vcc is supplied as driving electricity, the power window system 10 can be driven. Moreover, when the power supply voltage Vcc is supplied, the watchdog circuit 34 outputs the reset signal RS. The microcomputer 30 is started by this reset signal RS. When the starting of the microcomputer 30 begins, the microcomputer 30 outputs the clock signal ck at predetermined cycles. In this way, the watchdog circuit 34 starts monitoring of the microcomputer 30.

On the other hand, when the clock signal ck is input, the determination circuit 36 outputs the clock signal CK to the watchdog circuit 34, and the reset output signal Q is set and held at an H-level. The output signal Q is output to the AND circuit 38 as a signal for determining the operating state of the microcomputer 30 by the determination circuit 36. Namely, when the microcomputer 30 operates normally, a predetermined determination signal is output from the determination circuit 36.

When the output signal Q from the determination circuit 36 is set, the AND circuit 38 outputs the standby signal ST in accordance with the standby signal st which is output from the microcomputer 30. As a result, when the standby signal st is not input, the AND circuit 38 outputs an L-level signal.

As shown in FIG. 5, in the relay control circuit 40, when the standby signal ST is not output (an L-level), the AND circuits 50 and 54 switch the outputs in accordance with the UP signal and the DOWN signal which are output from the microcomputer 30 based on the operations of the UP switch $SW_U$ and the DOWN switch $SW_D$. In this way, the transistors 62 and 66 are driven and the window glass 18 is raised and lowered.

Figure 6A:
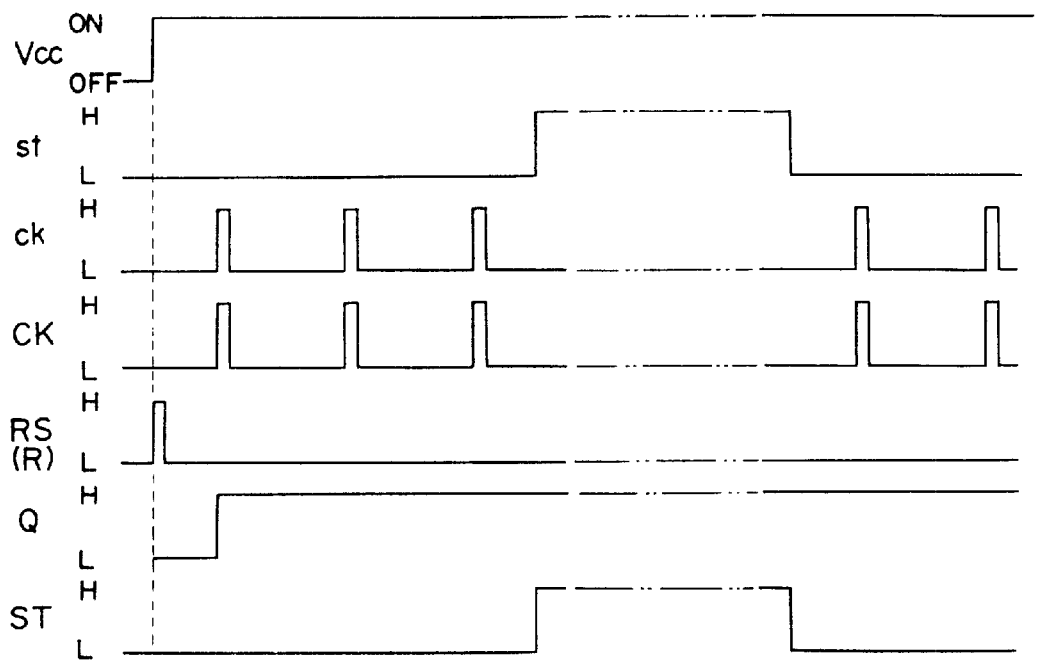
FIGS. 6(A) and 6(B) are timing charts which show operations of a control circuit.

As shown in FIG. 6(A), when the standby signal st is output from the microcomputer 30, the AND circuit 38 outputs the standby signal ST (an H-level) in accordance with the standby signal st and the output signal Q of the determination circuit 36. This standby signal ST is input to the watchdog circuit 34 and the relay control circuit 40.

Since the standby signal ST which is in accordance with the standby signal st output from the microcomputer 30 is input to the watchdog circuit 34, the watchdog circuit 34 enters the standby mode. As a result, electricity to be consumed is cut down.

Further, as shown in FIG. 5, when the standby signal ST (H-level) is input to the relay control circuit 40, the outputs of the AND circuits 50 and 54 are held at L-levels regardless of the UP signal and the DOWN signal which are input from the microcomputer 30. As a result, the transistors 62 and 66 are driven on the basis of outputs of the AND circuits 52 and 56.

As shown in FIG. 6(A), when the watchdog circuit 34 enters the standby mode, since the monitoring of the microcomputer 30 is suspended, the watchdog circuit 34 does not output the reset signal RS which restarts the microcomputer 30 to the microcomputer 30 even if the clock signal CK in accordance with the clock signal ck is not input from the microcomputer 30.

When the output of the standby signal st is stopped, the standby mode of the watchdog circuit 34 is terminated. Further, when the standby signal st is stopped, the determination circuit 36 can output the clock signal CK in accordance with the clock signal ck output from the microcomputer 30.

Thereafter, when the clock signal ck is output from the microcomputer 30 which has terminated the standby mode, the determination circuit 36 outputs the clock signal CK to the watchdog circuit 34. The watchdog circuit 34 starts monitoring of the microcomputer 30 based on the clock signal CK input from the determination circuit 36.

At this time, for example, when the output of the clock signal ck from the microcomputer 30 which does not output the standby signal st is stopped, the clock signal CK is not input to the watchdog circuit 34. When the clock signal CK is not input for a predetermined time, the watchdog circuit 34 outputs the reset signal RS to the microcomputer 30 and urges restarting of the microcomputer 30. The reset signal RS which is output from this watchdog circuit 34 is input to the determination circuit 36 as the reset signal R. When the reset signal R is input, the determination circuit 36 holds by switching the output signal Q to an L-level. In this way, whether the standby signal st is input or not, the AND circuit 38 does not output the standby signal ST.

The reset output signal Q is also output to the relay control circuit 40. As shown in FIG. 5, when the reset output signal Q is input to the relay control circuit 40, the transistors 62 and 66 are driven by the outputs of the AND circuits 52 and 56 in the same way as the standby signal ST is input.

In this way, in the microcomputer monitoring device 28, even if the standby signal st is input by mistake, the watchdog circuit 34 outputs the reset signal RS for restarting the microcomputer 30 without entering the standby mode and can urge restarting of the microcomputer 30. Moreover, since the relay control circuit 40 is switched so as to directly control the motor 14 on the basis of the output signal Q of the determination circuit 36 which is input from the microcomputer monitoring device 28 and in accordance with the operation of the UP switch $SW_U$ and the DOWN switch $SW_D$, an erroneous operation does not occur.

Further, when the standby signal st which is input by mistake is stopped, the microcomputer monitoring device 28 can start monitoring the microcomputer 30 normally.

Figure 6B:
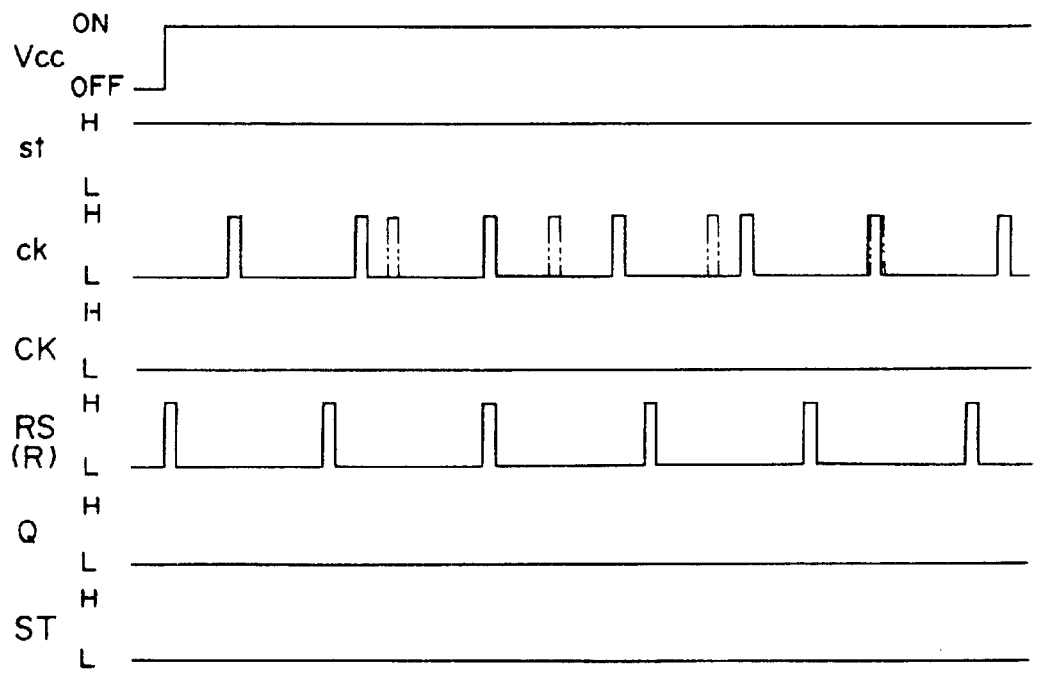

In a state in which the standby signal st is input to the microcomputer monitoring device 28, the microcomputer 30 may be restarted due to the input of the power supply voltage Vcc or the like. FIG. 6B shows an example in which the microcomputer monitoring device 28 detects the standby signal st when the power supply Vcc is input.

As the power supply voltage Vcc is applied, the watchdog circuit 34 outputs the reset signal RS and urges starting of the microcomputer 30. In this way, the output signal Q of the determination circuit 36 is reset. Thereafter, if the microcomputer 30 starts properly, the clock signal ck is output from the microcomputer 30 to the determination circuit 36.

At this time, since the standby signal st is input to the determination circuit 36, the determination circuit 36 stops the output of the clock signal CK whether the clock signal ck is input or not. Accordingly, the output signal Q of the FF circuit 48 which has been reset by the reset signal RS (S) is held in a reset state.

On the other hand, because the reset output signal Q is input to the AND circuit 38, even if the standby signal st is input thereto, the standby signal ST is not output. As a result, the watchdog circuit 34 does not enter the standby mode and continuously monitors the microcomputer 30.

Since the output of the clock signal CK from the determination circuit 36 to the watchdog circuit 34 is stopped, the watchdog circuit 34 outputs the reset signal RS every predetermined time. As a result, starting of the microcomputer 30 by the reset signal which is input at predetermined time intervals is repeated and a proper operation thereof is stopped. The clock signal ck which is output every predetermined time is shown by a solid line in FIG. 6(B). However, in reality, because restarting by the reset signal RS output from the watchdog circuit 34 is repeated, the clock signal ck shown by a double-dashed chain line in FIG. 6(B) is output.

Thus, in the microcomputer monitoring device 28 applied to the present embodiment, if the standby signal st is input when the microcomputer 30 is started, the microcomputer monitoring device 28 does not enter the standby mode and further repeats the output of the reset signal RS for starting the microcomputer 30. In this way, the microcomputer does not operate properly. Namely, since it is determined that the microcomputer monitoring device 28 cannot monitor the microcomputer properly, starting of the microcomputer 30 is prevented. In this way, the starting of the microcomputer which has entered the standby mode is prevented without being able to detect a state in which the state of the microcomputer 30 becomes abnormal or in which the microcomputer 30 enters the standby mode.

Further, when the microcomputer monitoring device 28 detects the wrong standby signal st, the output of the reset signal RS is repeated. Therefore, as means of detecting the reset signal RS which is repeatedly output is provided, abnormality of the microcomputer 30 or the microcomputer monitoring circuit 28 which monitors the microcomputer 30 can be reliably detected.

The above-described present embodiment shows an example to which the present invention is applied and the structure and the application of the present invention are not limited to the same. In the present embodiment, an example is described of a case in which the power window system 10 of the vehicle is provided at the vehicle operator's seat side door 12. However, the present invention is not limited to this and may be applied, in various types of control systems using a computer, to a computer monitoring device in which a computer is monitored and stopped being monitored on the basis of a first signal which is output from the computer in a predetermined cycles in accordance with a clock signal or the like and a second signal which is output from the computer with a predetermined timing.

As described above, in the present invention, even if the computer is started in a state in which the second signal is input, the starting means does not detect the first signal. Accordingly, due to the output of the starting signal, the operation of the computer is prevented in a state in which the operation thereof cannot be monitored properly. As a result, a superior effect is achieved in that an operator cannot fail to be aware of the improper operation of the computer.

What is claimed is:

1. A computer monitoring device, comprising:

a starting mechanism which outputs a starting signal before starting a computer, said starting mechanism outputting a starting signal to the computer when a first signal, which is output from the started computer is a predetermined cycle, is stopped for a predetermined period of time;

a start stopping mechanism which stops an operation of said starting mechanism when a second signal, which is output from the computer with a predetermined timing, is input;

a signal output mechanism which outputs said first signal, which is output from the computer in a state in which the second signal is not detected by said signal output mechanism, to said starting mechanism;

a start operation determination mechanism which outputs a third signal, which stops an operation of said start stopping mechanism, due to inputting of the starting signal to the start operation determination mechanism, said start operation determination mechanism stopping outputting of the third signal when the first signal is output from said signal output mechanism; and operation monitoring mechanism which receives the input second signal and stops outputting of the input second signal to said start stopping mechanism when said start operation determination mechanism outputs the third signal.

* * * * *